C. O. PEARSON & A. SUNDH.
ELECTRICALLY CONTROLLED ELEVATOR.
APPLICATION FILED OCT. 23, 1908.
985,699. Patented Feb. 28, 1911.
4 SHEETS—SHEET 2.
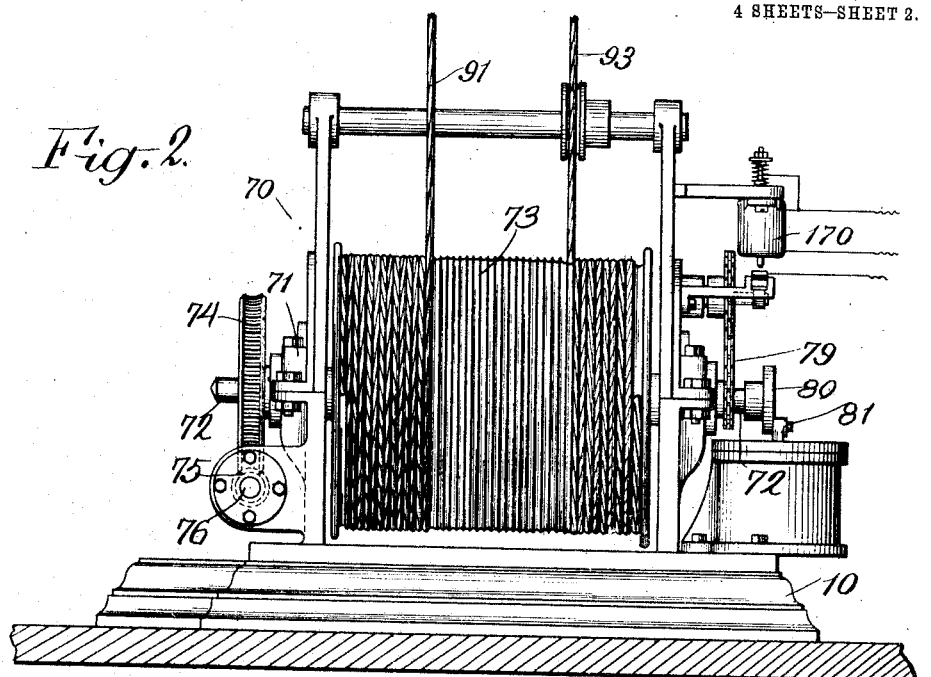
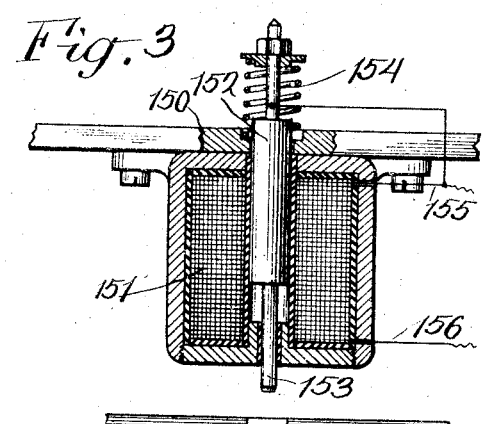
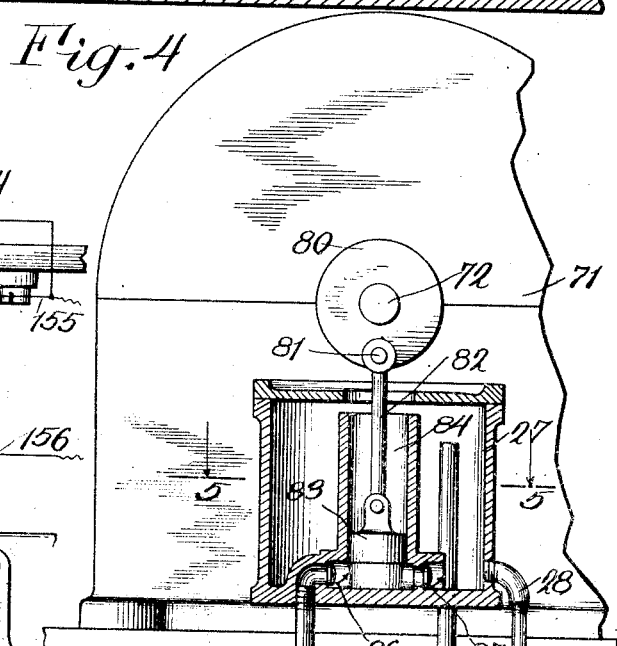
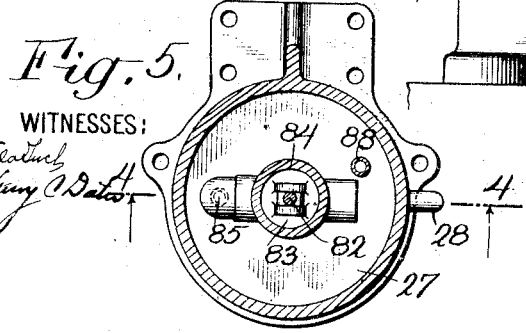

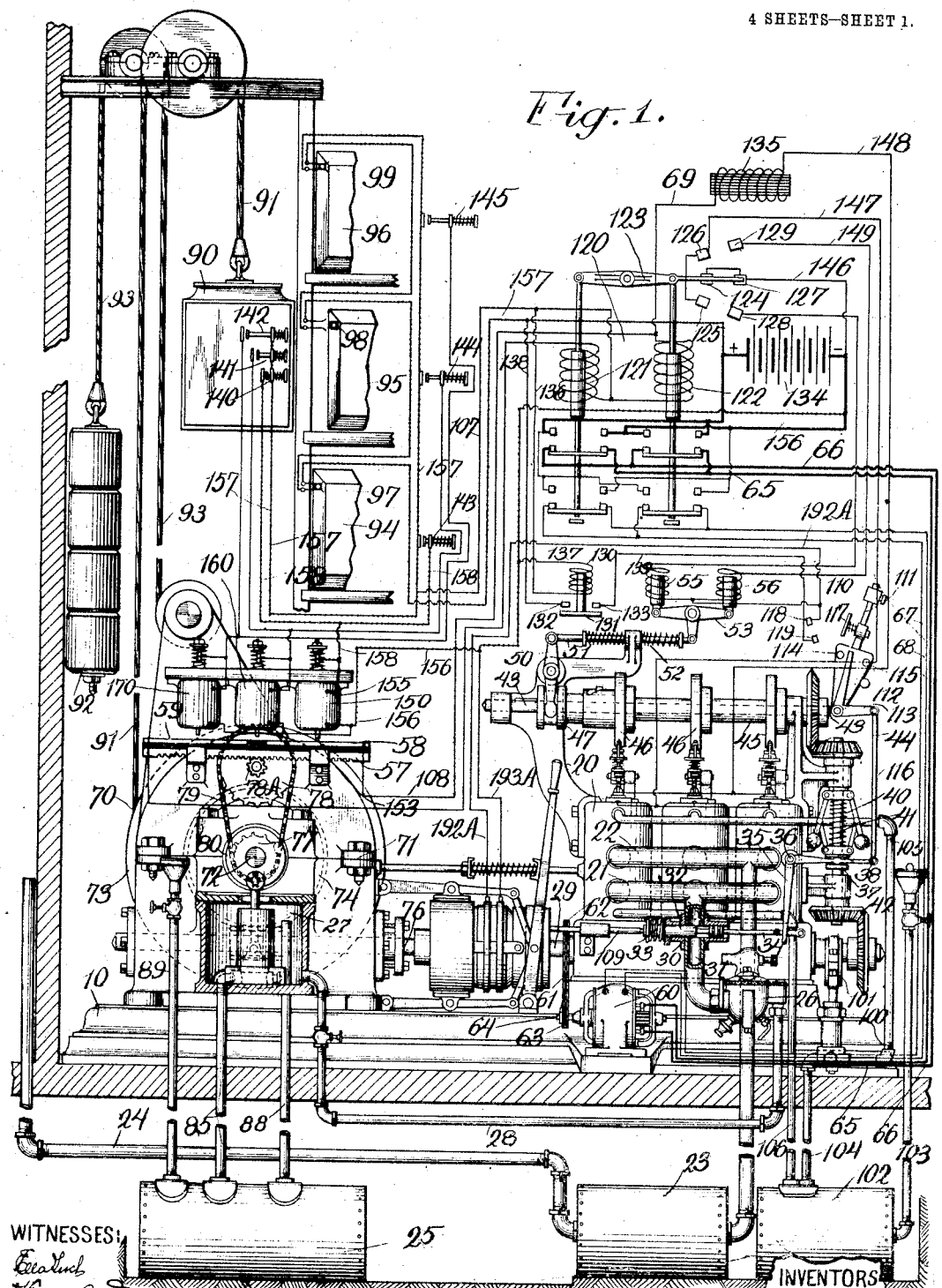

C. O. PEARSON & A. SUNDH.
ELECTRICALLY CONTROLLED ELEVATOR.
APPLICATION FILED OCT. 23, 1908.
985,699.
Patented Feb. 28, 1911.
4 SHEETS—SHEET 3.
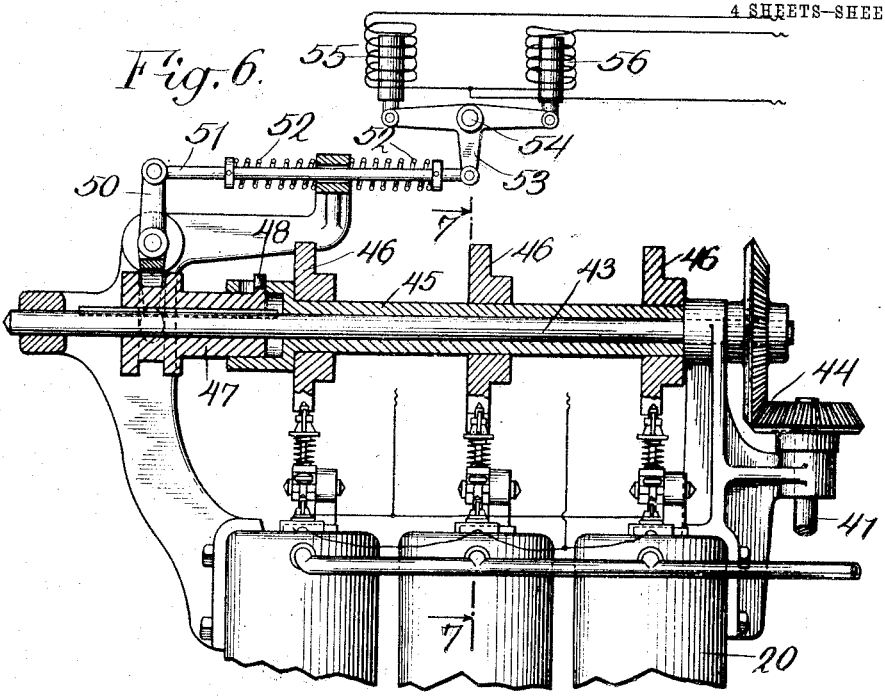
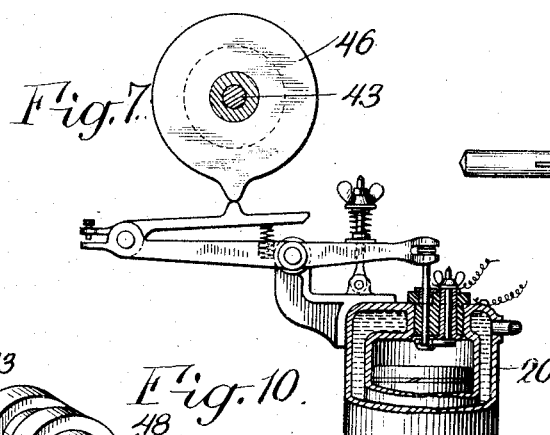
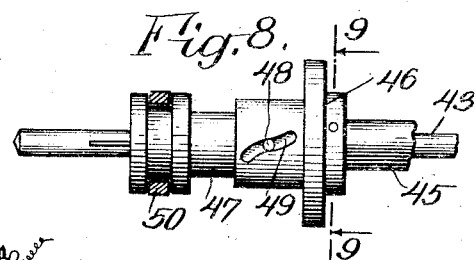
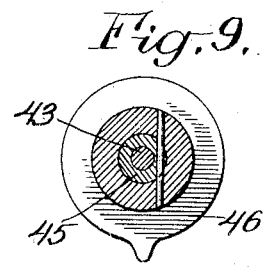
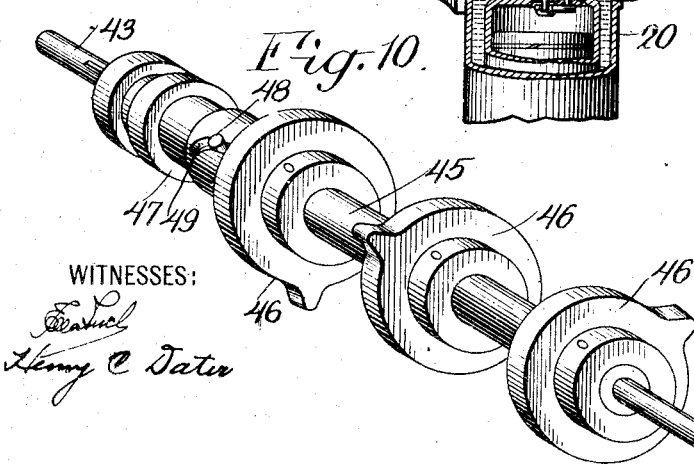
WITNESSES:
INVENTORS
Charles O. Pearson
and August Sundh
BY
E. W. Marshall
ATTORNEY

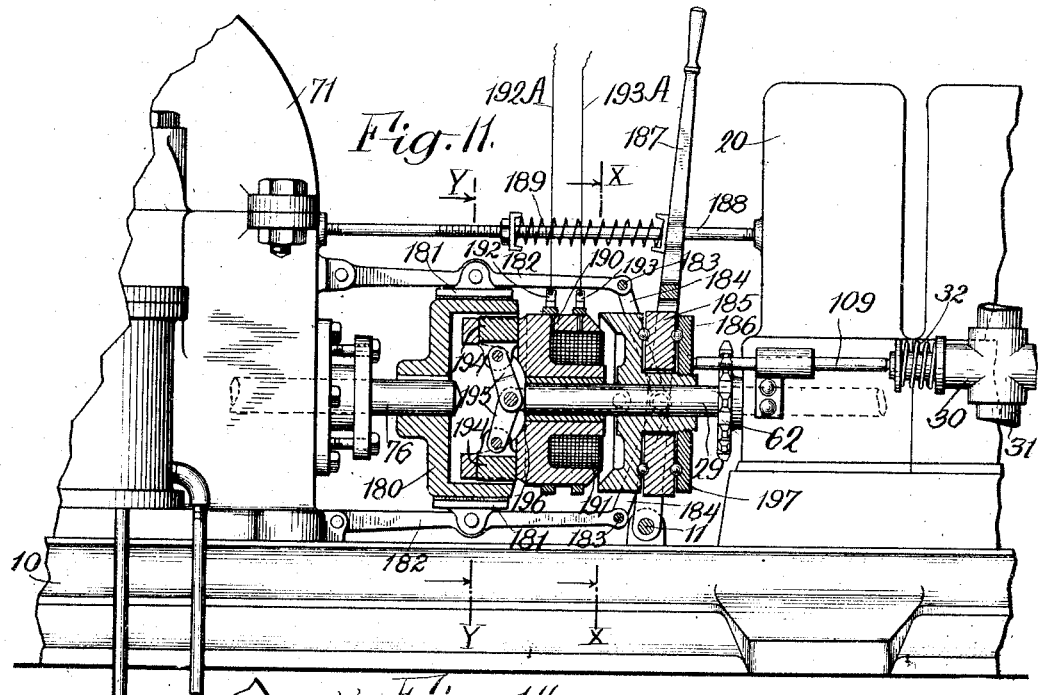
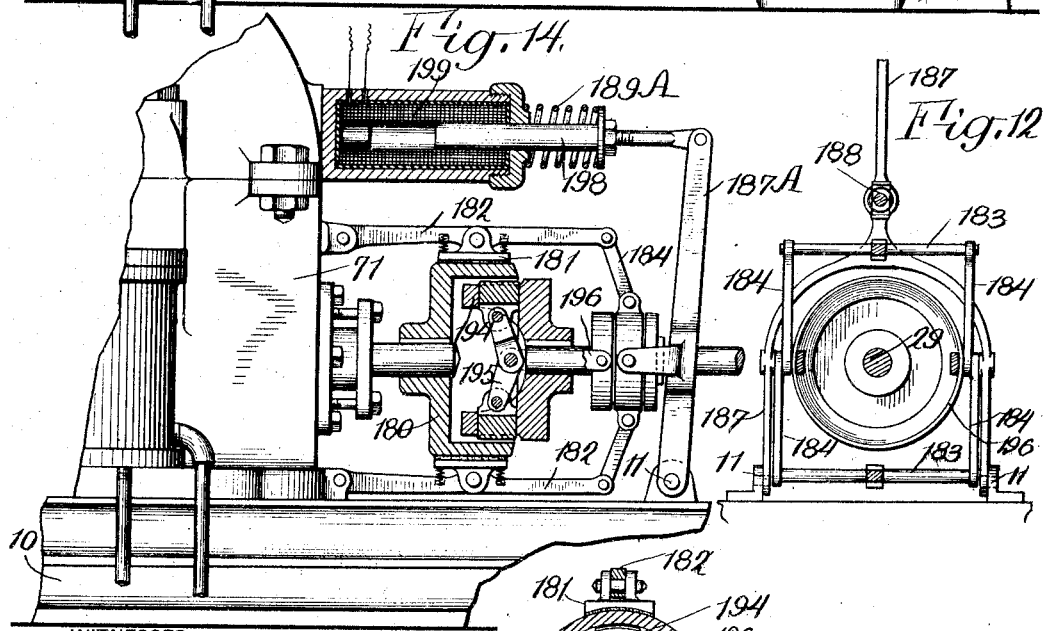
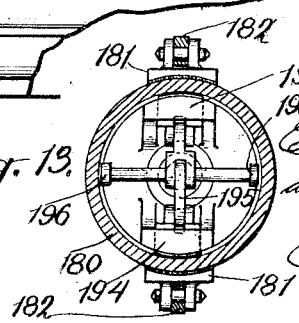

UNITED STATES PATENT OFFICE.

CHARLES O. PEARSON, OF NEW YORK, AND AUGUST SUNDH, OF YONKERS, NEW YORK, ASSIGNORS TO OTIS ELEVATOR COMPANY, OF NEW YORK, N. Y., A CORPORATION OF NEW JERSEY.

ELECTRICALLY-CONTROLLED ELEVATOR.

985,699.　　　　Specification of Letters Patent.　　Patented Feb. 28, 1911.

Application filed October 23, 1908. Serial No. 459,144.

*To all whom it may concern:*

Be it known that we, CHARLES O. PEARSON and AUGUST SUNDH, citizens of the United States, and residents, respectively, of the borough of Brooklyn, in the city, county, and State of New York, United States of America, and of the city of Yonkers, in the county of Westchester and State of New York, United States of America, have invented certain new and useful Improvements in Electrically-Controlled Elevators, of which the following is a specification.

Our invention relates to electrically controlled elevators, and especially to elevators driven by internal combustion engines which are started, stopped, reversed, and otherwise controlled by means of a novel electrical system which we will describe in the following specification, and the novel features of which we will point out in the appended claims.

Referring to the drawings, Figure 1 is a side elevation of an elevator apparatus and an internal combustion engine, together with certain other apparatus which may be used in carrying out our invention, with their connecting circuits shown diagrammatically. Fig. 2 is an end elevation of the hoisting apparatus and some of its associated parts, showing the hoisting drum and its driving gearing. Fig. 3 is a sectional elevation on a larger scale of one of the floor-control magnets. In Fig. 4 a fuel pump is shown in sectional side elevation, the section being taken on the line 4—4 of Fig. 5. Fig. 5 is a sectional plan view of this pump, the section being taken on the line 5—5 of Fig. 4. Fig. 6 is a side elevation of the upper part of the engine with its sparking mechanism drawn in section, and with a spark-advancing device connected therewith. Fig. 7 is a sectional end elevation of the top of one of the engine cylinders, showing its sparking mechanism somewhat in detail. This section is taken on the line 7—7 of Fig. 6. Fig. 8 is a plan view of a portion of the spark-advancing mechanism. Fig. 9 is a sectional end elevation of these parts, the section being taken on the line 9—9 of Fig. 8. Fig. 10 is a perspective view of the actuating shaft of the sparking mechanism and its cams. Fig. 11 is a side elevation, on an enlarged scale, of a portion of the hoisting apparatus and the engine, with their connecting clutch and the brake shown in section. Fig. 12 is a sectional end elevation of some of these parts, the section being taken on the line X—X of Fig. 11. Another sectional end elevation is shown in Fig. 13 in which the section is taken on the line Y—Y of Fig. 11. In Fig. 14 a modified form of the clutch-and-brake-actuating mechanism is shown in sectional side elevation.

Like characters of reference designate corresponding parts in all of the figures.

10 designates a base upon which are mounted an internal combustion engine 20 and other mechanisms which will be described hereinafter. The engine may be of any preferred type or form. In the present case it is shown as a three-cylinder two cycle gasolene engine, of which 21 is the intake or supply pipe, and 22 is the outlet or exhaust, which, after passing through a muffler 23, may be led off to a stack or chimney, or to some other desired place, by a pipe 24.

25 is a gasolene supply tank which is connected with a carbureter 26 through an auxiliary supply chamber 27 which we will describe later. A pipe 28 connects this auxiliary supply chamber with the carbureter. The carbureter is connected with the intake 21 of the engine through a regulating or throttle valve 30.

29 is the shaft of the engine 20.

The throttle valve 30 comprises a piston valve 32 which is in a passage 31 between the carbureter 26 and the engine intake 21. A compression spring 33 is arranged to hold this piston valve over to the left, in which direction it has a tendency to open the passage 31.

34 is a connecting rod between the other end of the piston valve and a downwardly projecting arm of a bell-crank lever 35 and is connected with the latter by a connection which allows a certain amount of lost motion. The bell-crank lever is pivoted to the engine frame at 36, and its other arm is connected at 37 with a centrifugal governor 40, and at 38 with a circuit-closing device which will be described later.

The centrifugal governor 40 is mounted upon a vertical rod 41 which is driven by the engine shaft 29 through bevel-gears 42, and is arranged to drive the actuating shaft 43 of the sparking mechanism.

44 are gears connecting the rod 41 and the shaft 43.

45 is a sleeve arranged to rotate in unison with the actuating shaft 43, but which may be relatively rotated about this shaft in one direction or the other a limited amount. 46 designates cams rigidly mounted upon this sleeve and arranged to actuate a sparking mechanism for each of the cylinders of the engine. Such a sparking mechanism as that shown in Fig. 7 may be used, or any of the other well-known arrangements may be substituted therefor if desired. The particular sparking mechanism shown in the drawings is a common form of "make and break" device in which the spark is formed within the cylinder by the separation of two electrodes or contacts which are arranged to be actuated by the rotary cam 46 through levers upon the outside of the cylinders.

47 is a collar upon the shaft 43 which is provided with a feather, so that the collar rotates with the shaft, but may be longitudinally moved thereon by means of a lever 50. One end of the collar 47 fits into an enlarged end of the sleeve 45, and is provided with a pin 48 which projects through a cam slot 49 in this enlarged portion of sleeve 45. The upper end of lever 50 is connected with a rod 51, which is provided with centering springs 52 which tend to keep the lever in a vertical position. The other end of rod 51 is connected with a downwardly projecting arm of a T-shaped lever 53 which is pivoted at 54.

55 and 56 designate electromagnets which are connected to either end of the horizontal arm of lever 53. These parts are so arranged that when one or the other of these magnets is energized, the lever 50 will be pulled or pushed over and the relative positions of the cams 46 to the shaft 43 changed thereby.

60 is an electrodynamic machine which may be mounted upon the base 10 and which is connected with the engine shaft 29 by a sprocket-chain 61 running over a sprocket wheel 62, which is keyed to the engine shaft, and over a similar sprocket-wheel 63 on its own shaft 64.

65 and 66 designate the leads from the armature of this machine 60, and 67, 68 the leads from its shunt field winding. It is evident that this machine will always run with the engine. It sometimes acts as a motor and sometimes as a generator as will appear more fully hereinafter.

70 designates a hoisting apparatus which comprises a frame 71 which is arranged to support a shaft 72 and other parts. Upon this shaft a winding drum 73 and a gear-wheel 74 are rigidly mounted. A worm-wheel 75 upon a shaft 76 is in mesh with this gear-wheel and is arranged to rotate the latter and the drum 73. The shaft 76 is arranged to be connected with and driven by the engine shaft 29 by a mechanism which we will point out later. 77 is a sprocket-wheel also mounted upon the shaft 72 and arranged to rotate, through the medium of a sprocket-chain 79, another sprocket-wheel 78 which is pivotally mounted upon the frame 71. A disk 80 is affixed to the end of shaft 72. A pin 81 projecting from this disk is connected with a connecting rod 82 which is arranged to reciprocate a piston 83 within a cylinder 84 when the disk rotates.

85 is a pipe leading from the gasolene tank 25 to the bottom of cylinder 84. A check-valve 86 controls the passage of gasolene into the cylinder 84 during the upward movement of the piston 83. Another check-valve 87 allows the gasolene to flow into the auxiliary gasolene chamber 27 during the downward movement of the piston 83.

88 is an over-flow pipe from chamber 27 to the gasolene tank.

89 is a filling chamber for the tank 25. The auxiliary chamber 27 surrounds the pumping apparatus above described and affords means for supplying fuel to the engine under a uniform head, and, at the same time, makes it possible to put the gasolene tank under the ground or place it in some other out-of-the-way location.

90 designates an elevator-car which is connected with one side of drum 73 by suitable ropes or cables 91. 92 is a counterweight connected with the other side of the drum by cables 93.

94, 95 and 96 designate hatchway doors leading to the elevator shaft at three respective landings. 97, 98 and 99 are contacts actuated by these doors. The contact 98 at the second landing is shown opened, those at the other two landings closed.

The engine 20 may be supplied with the usual water-jacket. 100 designates a water pump for circulating the water through this cooling-jacket. 101 is an eccentric upon the engine shaft 29 for driving this pump.

102 is a water tank which may be filled through a pipe 103.

104 is a pipe from the tank to the suction of the pump.

105 is the supply pipe from the pump to the engine, and 106 the return pipe from the water-jacket to the tank.

The switch 110 comprises a weighted arm 111, pivoted at 112, which is actuated by a bell-crank lever 113, pivoted to the same point and arranged to engage with pins 114 and 115 on the arm 111. The bell-crank lever is connected by a rod 116 with the centrifugal governor mechanism at 38. This switch arm carries a contact-plate 117. This contact plate 117 is arranged to bridge and connect a pair of stationary contacts 118 and 119 when the arm 111 is moved over by the governor mechanism.

120 is a reversing switch which comprises a plurality of coacting contacts and which is arranged to be actuated by electromagnets 121 and 122. Above the reversing switch and actuated by these magnets is a pivoted tilting lever 123 which is arranged to move a contact 124 against either one of stationary contacts 125 or 126, and at the same time, a contact 127 against either one of stationary contacts 128 or 129.

130 is an electromagnet which is arranged to raise a contact plate 131 against stationary contacts 132 and 133 whenever an energizing current is passed through its winding. 134 is a storage battery, the terminals of which are designated by + and −. 135 is a spark-coil which is used in conjunction with the ignition mechanism of the engine. The circuits and connections for these parts will be pointed out later.

In the car 90 are three push-buttons 140, 141 and 142, which correspond with and are electrically connected with three similar buttons 143, 144 and 145, one of which is placed at each of the three landings of the car.

150 is a floor control magnet for the first floor or landing. 160 and 170 are similar magnets for the second and third floors, respectively. One of these magnets is shown somewhat in detail in Fig. 3, from which it may be seen that it comprises a winding 151 which, when energized, is arranged to pull down a core 152 and a contact rod 153 against the action of a compression spring 154. One of the terminals of this winding is designated by 155, and this is connected with the core, and contact rod 153. 156 is a conductor leading to the other terminals of winding 151. The other magnets 160 and 170 are similarly constructed and comprise similar parts.

57 designates a slidable toothed rack which is in mesh with a pinion 78^A which is arranged to rotate with the sprocket-wheel 78. 58 and 59 are contact plates mounted upon but insulated from the upper side of this toothed rack.

Between the engine and the hoisting apparatus a clutch and brake mechanism is interposed. This is shown clearly in Fig. 11. A housing 180 is keyed to the end of shaft 76. The outer periphery of this housing forms a brake-pulley against which brake-shoes 181 are arranged to act. These brake-shoes are supported upon levers 182 which are pivoted to the frame of the hoisting apparatus. The other ends of the levers are connected by rods 183 and links 184 with a collar 185 which is loosely mounted within a rotatable member 186 which is slidably mounted upon the engine shaft 29. An operating lever 187 is pivoted to the base-plate 10 at 11 and is also connected with the collar 185.

188 is a guiding rod for lever 186. A compression spring 189 surrounding this rod is arranged to push the lever 187 over toward the engine to apply the brake and to release the clutch.

190 is an electromagnetic clutch member rigidly affixed to the end of the engine shaft 29. This member contains a winding 191, the terminals of which are connected with a pair of contact rings, against which brushes 192 and 193 bear. The clutch member carries a pair of clutch-dogs 194 upon toggle levers 195. These toggle levers are connected with the rotatable member 186 by links 196. The rotatable member is arranged to form an armature for the clutch member 190 so that when the latter is magnetized, it will pull the member 186 over and, through the mechanism above described, will cause the clutch-dogs 194 to be forced out into engagement with the housing 180, thus locking the clutch member and the housing together and causing the shaft 76 of the hoisting apparatus to revolve with the engine shaft 29. As the collar 185 does not revolve, we prefer to place antifriction bearings 197 between it and the sides of the rotatable member 186 which are adjacent to it. It is evident that when the rotatable member 186 has thus been shifted to actuate the clutch, it will, at the same time, release the brake-shoes. When the energizing current is cut off from the coil 191, the spring 189 will force the member 186 back, thus releasing the clutch and applying the brake. The lever 187 may be carried up, as shown in the drawings, to form a handle by means of which the clutch and brake may be actuated manually.

In the modification shown in Fig. 14, the upper end of lever 187^A is connected with the core 198 of an electromagnet 199 which takes the place of the magnetic clutch member 190. A spring 189^A pushes the lever over to apply the brake and loosen the clutch. When the magnet 199 is energized it will release the brake and apply the clutch. 109 is a push rod which is connected with the piston valve 32 to allow the valve to come to its full open position when the engine is coupled to the hoisting apparatus, and to partly close it when the clutch is released. The lost motion connection between the throttle valve and the centrifugal governor is provided so that this operation will not interfere with that of the governor, but will allow the governor to actuate the throttle valve to check the speed of the engine whenever it exceeds the desired amount.

We will now proceed to describe the operation of our invention.

The car is shown at the second of the three landings. This number of landings is chosen as it is sufficient to illustrate our invention, although, of course, any desired number of floors may be used. If it is desired to run the car down to the first floor, it may be done by pressing either the button 140 in the car or the button 143 at the first landing.

157 designates a conductor leading from the + side of the storage battery through the door contacts 97, 98 and 99 to all of the push buttons. Some of these control system wires are indicated in the drawings by rough lines so that they may be more readily traced. Pushing either of these buttons, for example 140 or 143 will close a circuit from the battery 134, through conductors 157 and 158, to the winding 151 of floor control magnet 150 through the latter, and back by conductor 156 to the — side of the battery. The contact rod 153 which is now connected with the battery will be drawn down onto the contact plate 58. This will connect the + side of the battery with the terminal 155 of the magnet, through conductor 107, magnet 122 of the reversing switch, and conductor 108. This will cause the magnet 150 to hold its core down and will energize the right-hand side of the reversing switch so that the contacts which are controlled by the magnet 122 will be closed. This will connect the armature leads 65 and 66 from the electrodynamic machine with the + and — terminals of the battery, respectively, and its shunt-field leads 67 and 68 in the same way. The terminal 69 of the spark coil 135 is connected with the + main of the battery if all of the door contacts are closed, and now the contact 124 which is connected with the — side of the battery by conductor 146, will connect the sparking apparatus with the other side of the spark coil through conductors 147 and 148. These operations will cause the electrodynamic machine to run as a motor and, through its connections with the engine shaft, to start the engine running in one direction. The engine will now draw in a supply of fuel which will be ignited in the usual manner, so that the engine will run under its own power. At the same time, if the door contacts are closed, a circuit will be closed from the battery through conductors 157, 107 and 136 to the winding of magnet 130, and by conductors 137 and 156 back to the battery. This magnet will cause contacts 132 and 133 to be bridged by contact plate 131 so as to cause contact 119 to be connected with the + end of the battery through conductors 157, 138 and 139. The contact 118 is connected with the other side of the battery by conductors 146, contacts 127 and 129, conductor 149, through the magnet winding 56. Therefore, when the contacts 118 and 119 are bridged by contact plate 117, the magnet 56 will be energized to shift the spark-advancing mechanism.

The energizing coil 191 of the clutch is connected with the — side of the battery by conductors 193^A and 156. Its other lead 192^A is connected with contact 118 so that it will be closed to the + side of the battery when contacts 132 and 133 are bridged as described, and when contacts 118 and 119 are connected together. Now, when the engine has reached a predetermined rate of speed, the governor 40 will actuate the switch arm 111 and cause the contact plate 117 to be moved over to connect the stationary contacts 118 and 119 so that the clutch will be thrown in to connect the hoisting apparatus with the rotating engine and the brake will be released. At the same time, the sparking mechanism will be shifted to advance the ignition sparks to increase the speed of the engine and consequently that of the elevator-car. The car will continue to run until the contact plate 58 has been moved from under contact rod 153, when the circuits through the reversing switch, the ignition mechanism and the clutch winding will be broken; then the clutch will be released and the brake applied, and at the same time the engine will stop running. These parts may be so adjusted that the car will come to rest at the lower landing. Now, if buttons 141 or 144, or 142 or 145 are pressed similar operations to those above described will take place, but in these cases the magnets 160 or 170 will be energized and the magnet 121 will close the left-hand side of the reversing switch. This will close the armature leads 65 and 66 to the — and + leads of the battery, and will cause the electrodynamic machine and the engine 20 to rotate in the opposite direction. The magnet 55 will be energized at the proper time to accelerate the speed of the engine. If the buttons 141 or 144 have been pressed, the car will run up until it reaches the second floor, when it will automatically stop in the manner previously described. Or, if buttons 142 or 145 have been pressed, it will run up to the third floor.

It may be seen that the electrodynamic machine acts as a starting device for the engine, and may even assist the engine in driving the car if the load of the latter is too heavy to allow the engine to attain its normal speed, but under ordinary conditions the engine, while running at its full speed, will drive the electrodynamic machine fast enough to cause it to generate current back into the battery and thus provide means for energizing the control system and for starting the engine.

This invention provides a simple electrical control system for elevators driven by internal combustion engines which is automatic in its action and therefore requires no skilled attendant. It not only provides a new use for gasolene and other steam engines, but makes the push-button or other automatic system of electrical control for elevators possible in places where a supply of electrical energy is not otherwise available.

What we claim is,—

1. An elevator car, a hoisting apparatus combined with a reversible internal combustion engine, a device for connecting the engine with said apparatus, means connected with the engine for starting said engine in either direction, said means being arranged to be driven by the engine to generate a supply of energy for starting the engine and for actuating the device for connecting the engine with the elevator apparatus, means for storing said supply of energy, and means for controlling said supply of energy from the car.

2. An elevator car, a hoisting apparatus combined with a reversible internal combustion engine, an electromagnetic device for connecting the engine with said apparatus, an electrodynamic machine connected with the engine, said machine being arranged to start the engine in either direction and to generate an electrical supply for controlling the engine and for energizing the device for connecting the engine with the elevator apparatus, a storage battery for the electrical supply, and means for controlling said electrical supply from the car.

3. An elevator car, a hoisting apparatus combined with a reversible internal combustion engine, an electromagnetic clutch for connecting the engine with said apparatus, an electrical control system for the engine, said system comprising operating circuits extending to the car, an electrodynamic machine connected with the engine, said machine being arranged to generate an electrical supply for energizing the control system to control the direction of rotation and the speed of the engine, and for energizing the clutch.

4. An elevator car, landings therefor, a hoisting apparatus combined with a reversible internal combustion engine, an electromagnetic clutch for connecting the engine with said apparatus, an electrical control system for the engine, said system comprising operating circuits extending to the car and the landings, an electrodynamic machine connected with the engine, said machine being arranged to start the engine in either direction and to generate an electrical supply for energizing the control system and the clutch, and a storage battery for the electrical supply.

5. An elevator apparatus combined with a reversible internal combustion engine, a sparking device therefor, an electrodynamic machine driven by the engine arranged to generate an electrical supply, a reversing switch for directing said electrical supply to energize said electrodynamic machine to start the engine in either direction and to connect and disconnect said electrical supply with and from the sparking device, electrically controlled means for connecting the engine with the elevator apparatus, a storage battery for the electrical supply, and a manually operated switch for controlling the reversing switch and said electrically controlled means.

6. An elevator apparatus combined with a reversible internal combustion engine, an electrodynamic machine connected therewith and arranged to generate an electrical supply, a storage battery for the electrical supply, circuits for said electrodynamic machine, a reversing switch for controlling said circuits and causing said supply to run the electrodynamic machine as a motor to start the engine in either direction, electrically actuated means for connecting the engine with the elevator apparatus, and a manually operated switch for controlling the reversing switch and said connecting means.

7. An elevator apparatus combined with a reversible internal combustion engine, an electrodynamic machine connected therewith and arranged to generate a supply of electrical energy, a storage battery for the electrical supply, a reversing switch arranged to connect said battery with the electrodynamic machine to cause said supply to run the electrodynamic machine in either direction as a motor, electrically actuated means for connecting the engine with the elevator apparatus, and a plurality of manually operated switches for controlling the reversing switch and said connecting means.

8. An elevator apparatus combined with a reversible internal combustion engine, a sparking device therefor, an electrodynamic machine driven by the engine to generate a supply of electrical energy, a storage battery for the electrical supply, a reversing switch arranged to connect said battery with the electrodynamic machine to cause said supply to run the electrodynamic machine in either direction as a motor and to thereby run the engine, said reversing switch being also arranged to control the supply to the sparking device, and a plurality of manually operated switches for controlling the reversing switch and said connecting means.

9. An elevator car, landings therefor, a hoisting apparatus combined with a reversible internal combustion engine, an electrodynamic machine connected therewith, said machine being arranged to start the engine in either direction, an electrical control system for the engine, said system comprising circuits extending to the car and the landings, and manually operated switches in the car and at said landings, said electrodynamic machine being arranged to generate an electrical supply for energizing the control system, and a storage battery arranged to be connected with the electrodynamic machine.

10. An elevator apparatus combined with a reversible internal combustion engine, a sparking device therefor, an electrodynamic means for shifting the sparking device in one direction when the engine is running in one direction, and in the opposite direction when the engine is running in the other direction, to thereby control the speed of the engine.

11. An elevator apparatus combined with a reversible internal combustion engine, an electrodynamic machine driven by the engine to generate a supply of electrical energy, a storage battery for the electrical supply, a reversing switch for directing said energy and causing it to assist the engine in driving its load in either direction, and a plurality of push-buttons arranged to control said reversing switch.

12. An elevator apparatus combined with an internal combustion engine, an electrodynamic machine positively connected therewith and arranged, when driven by the engine, to generate a supply of electrical energy, a storage battery for the electrical supply, and a manually controlled reversing switch for connecting said battery with the electrodynamic machine to cause said supply to drive the electrodynamic machine in either direction as a motor to start the engine in either direction, and to assist the engine in driving its load.

13. An elevator apparatus combined with an internal combustion engine, a sparking device therefor, an electrodynamic machine connected with the engine, said machine being arranged to start the engine and to generate a supply of electrical energy, a storage battery for the electrical supply, electromagnetic means energized by said supply for shifting the sparking device, an electromagnetically actuated switch for controlling the electrodynamic machine and said shifting means, and to connect and disconnect said battery with and from the sparking device.

14. An elevator hoisting apparatus, a car, a reversible internal combustion engine, an electrodynamic machine driven by the engine for generating an electrical supply, an electrodynamic means actuated by said electrical supply for magnetically connecting the hoisting apparatus with the engine whenever said hoisting apparatus is to be driven, and manual means for controlling said connecting device from the car.

15. An elevator apparatus, a brake therefor, said apparatus being constructed to be held by the brake when not driven, an internal combustion engine, an electrodynamic machine driven thereby to generate an electrical supply, an electromagnetic clutch between said apparatus and engine arranged to connect the apparatus with the engine whenever said apparatus is to be driven, and means for releasing the brake and actuating said clutch by the electrical supply.

16. An elevator hoisting apparatus, an internal combustion engine, means driven by said engine for generating electrical energy, a brake for the hoisting apparatus, a clutch for connecting and disconnecting said hoisting apparatus with and from the engine, manual means for actuating said brake and clutch, and other means also energized by said electrical energy for actuating the brake and clutch.

17. An elevator hoisting apparatus, an internal combustion engine, means driven by said engine for generating electrical energy, a brake for the hoisting apparatus, a clutch for connecting and disconnecting said hoisting apparatus with and from the engine, a lever for manually actuating said brake and clutch, and an electromagnet energized by said electrical energy for also actuating the brake and clutch.

18. An elevator hoisting apparatus combined with an internal combustion engine, an electrodynamic machine connected with the engine, said machine being arranged to start the engine and to generate a supply of electrical energy, a storage battery for the electrical supply, a brake for the elevator apparatus, a clutch arranged to connect and disconnect said elevator apparatus with and from the engine, actuating mechanism for said clutch and brake, said actuating mechanism being energized by said electrical supply, and an automatic switch arranged to release the brake and to throw in the clutch when the engine has reached a predetermined speed.

19. An elevator hoisting apparatus, an internal combustion engine, a throttle valve for said engine, an electrodynamic machine driven by the engine, said machine being arranged to start the engine and to generate a supply of electrical energy, a storage battery for the electrical supply, a brake for the hoisting apparatus, a clutch for connecting and disconnecting the hoisting apparatus with and from the engine, brake and clutch actuating mechanism energized by said electrical supply, an automatic switch arranged to control said brake and clutch actuating mechanism, and a centrifugal governor arranged to control the throttle valve and said automatic switch.

20. An elevator hoisting apparatus combined with an internal combustion engine, a throttle valve for the engine, an electrodynamic machine positively connected with the engine, and arranged to start the engine to generate a supply of electrical energy, a storage battery for the electrical supply, a brake for the hoisting apparatus, a clutch arranged to connect and disconnect said hoisting apparatus with and from the engine, an electromagnetically operated brake and clutch actuating mechanism arranged to be energized by said electrical supply, an automatic switch arranged to control said brake and clutch actuating mechanism, a centrifugal governor arranged to actuate the throttle valve and the automatic switch to govern the speed of the engine and to release the brake and throw in the clutch when the engine has reached a predetermined speed, and a connection between the brake and clutch actuating mechanism and the throttle valve.

21. An elevator hoisting apparatus combined with an internal combustion engine, a sparking device and a throttle valve for the engine; a centrifugal governor connected with the throttle valve, an electrodynamic machine positively connected with the engine, said machine being arranged to start the engine and to generate a supply of electrical energy, a storage battery for the electrical supply, electromagnetic mechanism energized by said supply for shifting the sparking device, a reversing switch arranged to connect said battery with the electrodynamic machine to cause said supply to run the electrodynamic machine in either direction as a motor, said reversing switch being also arranged to control the current supply to the sparking device and to control the electromagnetic spark shifting mechanism; a brake for the hoisting apparatus, a clutch for connecting and disconnecting said hoisting apparatus with and from the engine, an electromagnet arranged to actuate said brake and clutch, and a connection between said electromagnet and the throttle valve.

22. An elevator hoisting apparatus, a car, an internal combustion engine, an electrodynamic machine for starting the engine in either direction, and a control system for controlling said electrodynamic machine, a manually operated switch at a point removed from the engine, said control system comprising circuits connecting the electrodynamic machine, the engine and said switch and being energized by the electrodynamic machine.

23. An elevator hoisting apparatus, a car, an internal combustion engine, an electrodynamic machine driven by the engine and arranged to generate an electrical supply, a storage battery for the electrical supply, a reversing switch, and means in the car to cause the reversing switch to be actuated to direct said electrical supply and to cause said supply to energize the electrodynamic machine to start the engine.

24. An elevator hoisting apparatus, a car, an internal combustion engine, an electrodynamic machine connected therewith and arranged to generate an electrical supply, a storage battery for the electrical supply, circuits for said electrodynamic machine, and a control system comprising a push button in the car for controlling said circuits and causing said electrical supply to run the electrodynamic machine as a motor until the engine attains its speed.

25. An elevator hoisting apparatus, a car, landings for said car, an internal combustion engine, an electrodynamic machine connected therewith and arranged to generate an electrical supply, a storage battery for the electrical supply, circuits for said electrodynamic machine, a control system comprising a push button in the car and at said landings for controlling said circuits from the car or from said landings and causing said electrical supply to run the electrodynamic machine as a motor until the engine attains its speed, and a centrifugal governor for controlling the speed of the engine and the car.

26. An elevator hoisting apparatus, a car, landings for said car, an internal combustion engine, an electrodynamic machine connected therewith and arranged to generate an electrical supply, a storage battery for the electrical supply, circuits for said electrodynamic machine, a control system comprising a push button in the car and at said landings for controlling said circuits from the car or from said landings, and causing said electrical supply to run the electrodynamic machine as a motor until the engine attains its speed, an automatic switch for said circuits, and a centrifugal governor driven by the engine and arranged to actuate said automatic switch.

27. An elevator hoisting apparatus, a car, landings for said car, an internal combustion engine, an electrodynamic machine connected therewith, a reversing switch for said machine, a storage battery arranged to be connected with the electrodynamic machine, and push-buttons for controlling the reversing switch from the car or from said landings to cause said machine to start the engine in either direction.

28. An elevator hoisting apparatus, a car, landings for said car, an internal combustion engine, a sparking device for the engine, an electrodynamic machine driven by the engine and arranged to generate an electrical supply, a storage battery arranged to be connected with the electrodynamic machine, a control system comprising a push button in the car and at said landings for controlling said electrical supply from the car or from said landings to cause said supply to energize the electrodynamic machine to start the engine and to connect and disconnect said battery with and from the sparking device.

29. An elevator hoisting apparatus, a car, landings for said car, an internal combustion engine, a sparking device therefor, an electromagnetic machine driven by the engine and arranged to generate an electrical supply, electromagnetic means energized by said supply for shifting the sparking device to control the speed of the engine, and push-buttons for controlling said electromagnetic means from the car or from said landings.

30. An elevator hoisting apparatus, a car, landings for said car, an internal combustion engine, a sparking device therefor, an electrodynamic machine connected with the engine, said machine being arranged to start the engine and to generate a supply of electrical energy, a storage battery for the electrical supply, electromagnetic mechanism energized by said supply for shifting the sparking device, a reversing switch arranged to connect said battery with the electrodynamic machine to cause said supply to run the electrodynamic machine in either direction as a motor, said reversing switch being also arranged to control the current supply to the sparking device and to control the electromagnetic spark-shifting mechanism, and push-buttons for controlling the reversing switch from the car or from said landings.

31. An elevator hoisting apparatus, a car, an internal combustion engine, an electrodynamic machine connected therewith, said machine being arranged to start the engine and to generate a supply of electrical energy, a storage battery for the electrical supply, a clutch for connecting and disconnecting the hoisting apparatus with and from the engine, an electromagnet energized by said electrical supply for actuating said clutch, and means for controlling the electrodynamic machine and said clutch actuating mechanism from the car.

32. An elevator hoisting apparatus, a car, landings for said car, an internal combustion engine, an electrodynamic machine connected therewith, said machine being arranged to start the engine and to generate a supply of electrical energy, a storage battery for the electrical supply, a brake for the hoisting apparatus, a clutch for connecting and disconnecting the hoisting apparatus with and from the engine, an electromagnet for actuating said brake and clutch, and a control system comprising a push button in the car and at said landings for controlling said brake and clutch actuating magnet from the car or from said landings.

33. An elevator hoisting apparatus, a car, landings for said car, an internal combustion engine, an electrodynamic machine connected therewith, said machine being arranged to start the engine and to generate a supply of electrical energy, a storage battery for the electrical supply, a brake for the hoisting apparatus, a clutch for connecting the hoisting apparatus with and from the engine, an electromagnet for actuating said brake and clutch, and a control system comprising a push button in the car and at said landings arranged to control the electrodynamic machine and the brake and clutch actuating mechanism from the car or from said landings.

34. An elevator hoisting apparatus, a car, landings therefor, an internal combustion engine, an electrodynamic machine positively connected therewith, said machine being arranged to start the engine in either direction and to generate a supply of electrical energy, a storage battery for the electrical supply, a brake for the hoisting apparatus, a clutch for connecting and disconnecting the hoisting apparatus with and from the engine, an electromagnet for actuating the brake and clutch, and an electrical control system comprising a plurality of push-buttons in the car, a push-button at each landing, and conductors therefor, for controlling the electrodynamic machine and the brake and clutch actuating magnet.

35. An elevator hoisting apparatus, a car, landings for said car, an internal combustion engine, means driven by said engine for generating electrical energy, a brake for the hoisting apparatus, a clutch for connecting and disconnecting said hoisting apparatus with and from the engine, a lever for manually actuating said brake and clutch, an electromagnet energized by said electrical energy for also actuating the brake and clutch, and an electrical control system comprising a plurality of push-buttons in the car and a push-button at each landing for controlling the electrodynamic machine and the brake and clutch actuating means.

36. An elevator hoisting apparatus, a car, landings for said car, an internal combustion engine, a sparking device and a throttle valve for the engine, a centrifugal governor connected with the throttle valve, an electrodynamic machine positively connected with the engine, said machine being arranged to start the engine and to generate a supply of electrical energy, a storage battery for the electrical supply, electromagnetic mechanism energized by said supply for shifting the sparking device, a reversing switch arranged to connect said battery with the electrodynamic machine to cause said supply to run the electrodynamic machine in either direction as a motor, said reversing switch being also arranged to control the current supply to the sparking device and to control the electromagnetic spark shifting mechanism, a brake for the hoisting apparatus, a clutch for connecting and disconnecting said hoisting apparatus with and from the engine, an electromagnet arranged to actuate said brake and clutch, a connection between said electromagnet and the throttle valve, and an electrical control system comprising a plurality of push-buttons in the car and a push-button at each landing for controlling the electrodynamic machine and the brake and clutch actuating means.

37. An elevator hoisting apparatus, a car, landings for said car, an internal combustion engine, an electrodynamic machine for starting the engine in either direction, a storage battery arranged to be connected with said electrodynamic means, an electrical control system for controlling said electrodynamic machine from a point removed from the engine, said electrical control system comprising a plurality of push-buttons in the car and a push-button at each landing for controlling the electrodynamic machine and the brake and clutch actuating means.

38. An elevator apparatus combined with an internal combustion engine, an electrodynamic machine connected therewith, said machine being arranged to start the engine and to generate an electrical supply for controlling the engine, a storage battery for the electrical supply, a fuel supply for the engine, an auxiliary chamber for the fuel, and a fuel pump actuated by the elevator apparatus.

39. An elevator hoisting apparatus, a car, landings for said car, a door at each landing, door contacts controlled by said doors, an internal combustion engine, an electrodynamic machine connected therewith and arranged to generate an electrical supply, a storage battery for the electrical supply, circuits for said electrodynamic machine, a control system supplied by the circuit running through the door contacts and comprising push-buttons for controlling said circuits from the car or from said landings, and causing said electrical supply to run the electrodynamic machine as a motor to start the engine.

40. An elevator hoisting apparatus, a car, landings for said car, a door at each landing, door contacts controlled by said doors, an internal combustion engine, an electrodynamic machine connected therewith and arranged to generate an electrical supply, a storage battery for the electrical supply, circuits for said electrodynamic machine, a control system supplied by a circuit running through the door contacts and comprising push-buttons for controlling said circuits from the car or from said landings and causing said electrical supply to run the electrodynamic machine as a motor to start the engine and the car, and automatic means for stopping the hoisting apparatus when the car reaches a desired landing.

41. An elevator hoisting apparatus, a car, landings for said car, an internal combustion engine, an electrodynamic machine connected therewith, a reversing switch for said machine, and an automatic control system comprising a plurality of push-buttons for controlling the reversing switch from the car or from said landings to cause said machine to start the engine and the car in either direction, and an automatic floor controller arranged to stop the hoisting apparatus and the engine when the car reaches a desired landing.

42. An elevator hoisting apparatus, a car, landings for said car, an internal combustion engine, an electrodynamic machine connected therewith, a reversing switch for said machine, and an automatic push-button system for controlling the reversing switch from the car or from said landings to cause said machine to start the engine and the car in either direction, said push-button system comprising floor control magnets and contacts therefor, said contacts being moved by the hoisting apparatus and arranged to break the controlling circuits and to stop the hoisting apparatus and the engine when the car reaches a desired landing.

43. An elevator hoisting apparatus, a car, landings for said car, a door at each landing, door contacts controlled by said doors, an internal combustion engine, an electrodynamic machine connected therewith, a reversing switch for said machine, and an automatic push-button system for controlling the reversing switch from the car or from said landings to cause said machine to start the engine and the car in either direction, said push-button system being energized by a circuit passing through the door contacts and comprising floor control magnets and contacts therefor, said contacts being moved by the hoisting apparatus and arranged to break the controlling circuits and to stop the hoisting apparatus and the engine when the car reaches a desired landing.

44. An elevator hoisting apparatus, a car, landings therefor, a door at each landing, door contacts controlled by said doors, an internal combustion engine, an electrodynamic machine positively connected therewith, a reversing switch therefor, said machine being arranged to start the engine in either direction, and to generate a supply of electrical energy, a storage battery for the electrical supply, a brake for the hoisting apparatus, a clutch for connecting and disconnecting the hoisting apparatus with and from the engine, an electromagnet for actuating the brake and clutch; and an electrical control system comprising controlling circuits, a plurality of push-buttons in the car and a push-button at each landing, for controlling the electrodynamic machine, the brake and clutch actuating magnet to cause said electrical supply to start the engine and the hoisting apparatus, said push-buttons being supplied by a circuit running through the door contacts, and a floor control magnet corresponding with each landing, contacts for said floor control magnets actuated by the hoisting apparatus and arranged to automatically break the control circuits to stop the hoisting apparatus and the car when the car reaches a desired landing.

45. An elevator hoisting apparatus, a car, landings for said car, a door at each landing, door contacts controlled by said doors, an internal combustion engine, a sparking device and a throttle valve for the engine, a centrifugal governor connected with the throttle valve, an electrodynamic machine positively connected with the engine, said machine being arranged to start the engine and to generate a supply of electrical energy, a storage battery for the electrical supply, electromagnetic mechanism energized by said supply for shifting the sparking device, a reversing switch arranged to connect said battery with the electrodynamic machine to cause said supply to run the electrodynamic machine in either direction as a motor to start the engine, said reversing switch being also arranged to control the current supply to the sparking device and to control the electromagnetic spark-shifting mechanism, a brake for the hoisting apparatus, a clutch for connecting and disconnecting said hoisting apparatus with and from the engine, an electromagnet arranged to actuate said brake and clutch, a connection between said electromagnet and the throttle valve; and an electrical control system comprising controlling circuits, and a plurality of push-buttons in the car and a push-button at each landing for controlling the electrodynamic machine and the brake and clutch actuating magnet to cause said electrical supply to start the engine and the hoisting apparatus, said push-buttons being supplied by a circuit running from the door contacts, and a floor control magnet corresponding with each landing, contacts for said floor control magnet actuated by the hoisting apparatus and arranged to automatically break the control circuits to stop the hoisting apparatus and the car when the car reaches a desired landing.

In testimony whereof we have signed our names to this specification in the presence of two subscribing witnesses.

CHARLES O. PEARSON.
AUGUST SUNDH.

Witnesses:
ERNEST W. MARSHALL,
ELLA TUCH.

---

Copies of this patent may be obtained for five cents each, by addressing the "Commissioner of Patents, Washington, D. C."